(12) United States Patent
Kimura et al.

(10) Patent No.: US 6,612,813 B2
(45) Date of Patent: Sep. 2, 2003

(54) POWER TRANSMISSION MECHANISM

(75) Inventors: Kazuya Kimura, Kariya (JP); Akifumi Uryu, Kariya (JP); Takeshi Kawata, Kariya (JP); Akinobu Kanai, Kariya (JP); Takahiro Suzuki, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 0 days.

(21) Appl. No.: 09/956,668

(22) Filed: Sep. 20, 2001

(65) Prior Publication Data
US 2002/0049106 A1 Apr. 25, 2002

(30) Foreign Application Priority Data
Sep. 22, 2000 (JP) ........................................ 2000-289087

(51) Int. Cl.7 .............................. F04B 35/00; F04B 9/00
(52) U.S. Cl. ...................... 417/319; 417/223; 192/54.2; 464/42; 464/81
(58) Field of Search ................................. 417/319, 269, 417/223, 222.1, 222.2; 192/56.5, 56.4, 54.2; 474/70, 93, 199; 464/81–83, 85, 89, 34, 42, 43, 46, 51, 185

(56) References Cited

U.S. PATENT DOCUMENTS

| | | | | |
|---|---|---|---|---|
| 4,859,156 A | * | 8/1989 | Kikuchi | 417/319 |
| 5,899,811 A | * | 5/1999 | Kishibuchi et al. | 464/30 |
| 5,944,156 A | * | 8/1999 | Hatakeyama | 192/56.5 |
| 6,068,452 A | * | 5/2000 | Okada et al. | 417/223 |
| 6,213,733 B1 | * | 4/2001 | Obrist et al. | 417/319 |

FOREIGN PATENT DOCUMENTS

| | | |
|---|---|---|
| JP | 10-267045 | 10/1998 |
| JP | 0 890 760 A2 * | 1/1999 |
| JP | 2000-161382 | 6/2000 |

* cited by examiner

Primary Examiner—Charles G. Freay
Assistant Examiner—Han L Liu
(74) Attorney, Agent, or Firm—Knoble & Yoshida, LLC

(57) ABSTRACT

A power transmission mechanism has a first rotating member rotating around an axis, a second rotating member rotating around the axis and an elastic member located between the first rotating member and the second rotating member. The first rotating member has a first rotating member surface, and the second rotating member has a second rotating member surface. The elastic member has at least a protrusion contacting at least the first rotating member surface. The protrusion extends in a circumferential direction of the first rotating member. The protrusion has gradually tapering shape toward the first rotating member surface. The elastic member is deformed by compression as the elastic member engages the first rotating member surface and the second rotating member surface by rotation of the first rotating member, thereby causing relative rotation of the first rotating member and the second rotating member.

19 Claims, 9 Drawing Sheets

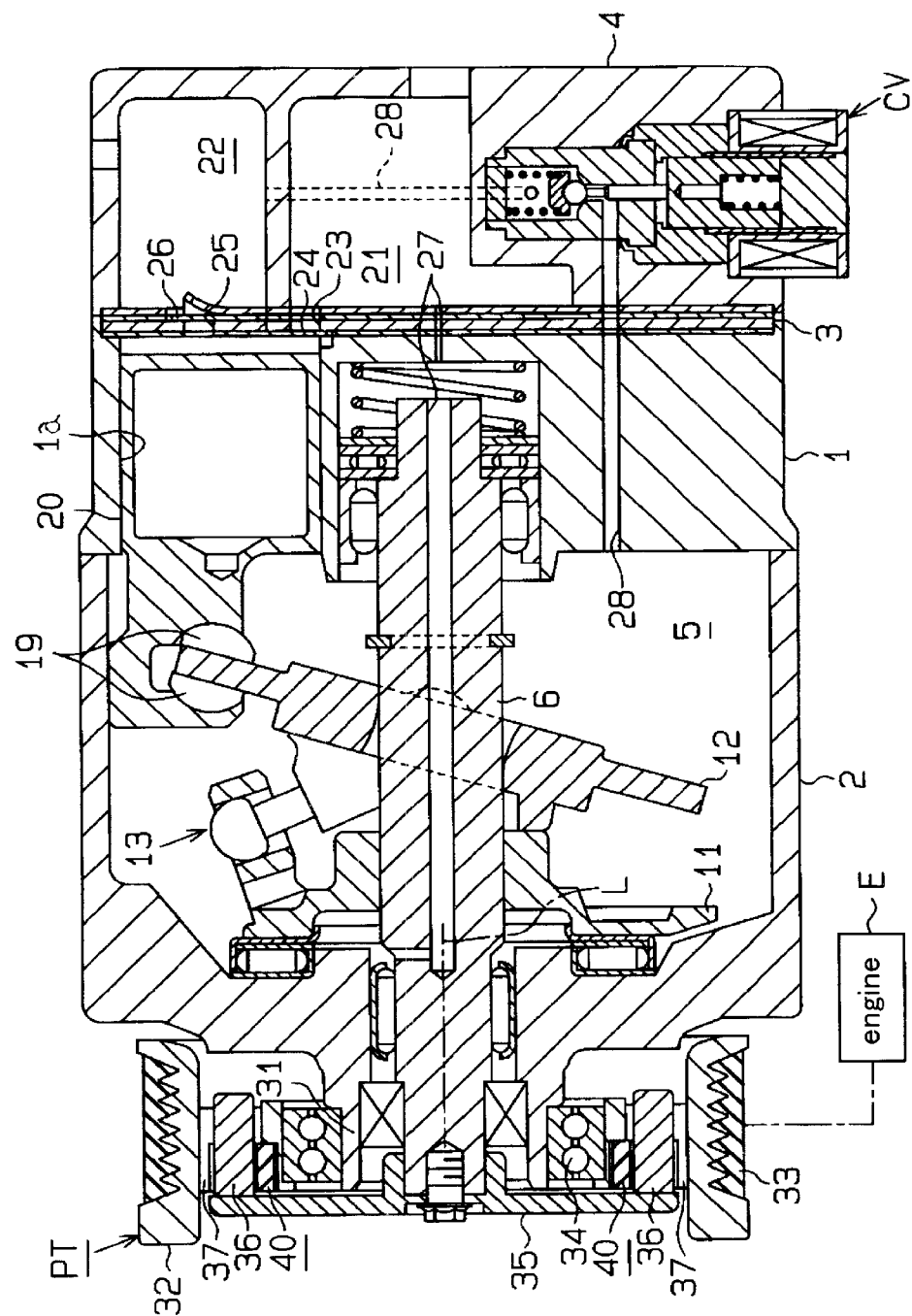

POWER TRANSMISSION MECHANISM

BACKGROUND OF THE INVENTION

The present invention relates to a power transmission mechanism capable of absorbing a torque change transmitted between two rotating members.

Japanese Unexamined Patent Publication No. 10-267045 discloses an example of a power transmission mechanism. As shown in FIG. 11, a pulley 101 functions as a first rotating member at an external drive source side, and a hub 102 functions as a second rotating member at an equipment side. The pulley 101 and the hub 102 are operably connected through an elastic member 103 that is made of rubber and is sandwiched between engaged recesses 104 formed on the pulley 101 and the hub 102.

When drive power is transmitted from the external drive source to the equipment, the elastic member 103 is deformed due to torque transmitted between the pulley 101 and the hub 102, which allows relative rotation between the pulley 101 and the hub 102. At the same time, the torque allows the relative rotation angle between the pulley 101 and the hub 102 to vary within a predetermined range. As a result, the relative rotation between the pulley 101 and the hub 102 absorbs a differential torque transmitted between the pulley 101 and the hub 102 whenever the transmitted torque between the pulley 101 and the hub 102 changes due to changes in output torque from the external drive source and/or changes in torque in the torque receiving equipment itself.

Japanese Unexamined Patent Publication No. 10-267045 discloses only a torque limiting function of a drive power transmission apparatus as shown in FIG. 11. The elastic member 103 disengages from the engaged recess 104 thereby disconnecting the power transmission between the pulley 101 and the hub 102, when a drive torque acting on the equipment becomes excessive. However, it is apparent that the torque change disclosed in the above publication is absorbed by optimizing the elastic coefficient of the elastic member 103 corresponding to a slope of a line 211 in FIG. 12 as will be later described.

In a power transmission mechanism according to the above publication as shown in FIG. 11, the elastic member 103 has a cylindrical shape. Also, a recessed curved surface 104a having the same curvature as a cylindrical surface 103a of the elastic member 103 is formed in a recess 104. In other words, the recessed curved surface 104a of the engaged recess 104 contacts the elastic member 103 entirely, when the transmitted torque is zero.

To increase the relative rotation angle between the pulley 101 and the hub 102 and to counter the large elasticity of the elastic member 103, the elastic member 103 must be deformed sufficiently even near a zero degree state of the relative rotation angle. As a result, FIG. 12 shows a graph between the transmitted torque of the power transmission mechanism and the relative rotation angle according to the prior art. A straight line 211 has a somewhat large slope. Therefore, the transmitted torque between the pulley 101 and the hub 102 changes suddenly within a predetermined range of angle based on the changes in the relative rotation angle.

To simplify the description of the above problem derived from a character illustrated in FIG. 12, the conventional power transmission mechanism assumes that the equipment such as the hub 102 rotates at a constant speed while the pulley 101 rotates due to the torque changed by the external drive source. That is, the torque change is accompanied by the change of the relative rotation angle. In this case, a change in rotation angle or in torque at the external drive source is defined as relative rotation angle of the pulley 101 with respect to the hub 102.

Also assume the following state. As indicated with dotted lines 212 in FIG. 12, a torque is caused by a compact equipment or an equipment whose torque is variable is in a small drive torque state, that is, in a state of a small relative rotation angle between the pulley 101 and the hub 102. In addition, a large change in a relative angle indicated by a curve 213 generates between the pulley 101 and the hub 102 at the external drive source. In this case, around troughs of torque generated by the external drive source, which is indicated by peaks on the left of the curve 213, the pulley 101 rotates relative to the hub 102 in a reverse direction with respect to a state in which the torque is zero, which is reverse to a normal direction, which transmits the torque from the external drive source to the equipment.

The reverse torque amplifies the differential torque generated by the power transmission system between the hub 102 and the equipment, which is indicated with the curve 214 as shown in FIG. 12. The excess torque load, substantially represented by negative half of the curve 214 of differential torque, generates a torque that works in a reverse direction or a negative torque. If there is a clearance in a torque transmitting direction between the hub 102 and the equipment or inside the equipment, relative rotation between the rotating members is caused and the power transmission in a normal direction is interrupted. The positive and negative torque act relatively and alternately to each other to offset the clearance of the rotating members. The clearance causes abnormal vibrations and noise due to collision of the rotating members, and it eventually wears the rotating members and increases chattering.

SUMMARY OF THE INVENTION

The present invention provides a power transmission mechanism which is capable of absorbing a change of a torque transmitted between a first rotating member and a second rotating member during a power transmission process. It also provides a power transmission mechanism which reduces a negative torque to an equipment even if a large torque change occurs at the external drive source.

To achieve the above objectives, the present invention has following features. A power transmission mechanism has a first rotating member rotating around an axis, a second rotating member rotating around the axis and an elastic member located between the first rotating member and the second rotating member. The first rotating member has a first rotating member surface, and the second rotating member has a second rotating member surface. The elastic member has at least a protrusion contacting at least the first rotating member surface. The protrusion extends in a circumferential direction of the first rotating member. The protrusion has gradually tapering shape toward the first rotating member surface. The elastic member is deformed by compression as the elastic member engages the first rotating member surface and the second rotating member surface by rotation of the first rotating member, thereby causing relative rotation of the first rotating member and the second rotating member.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

FIG. 1 is a diagram in a cross-sectional view illustrating an embodiment of the compressor with the power transmission mechanism according to the present invention;

DETAILED DESCRIPTION OF THE PREFERRED EMBODIMENTS

Figure 2A:
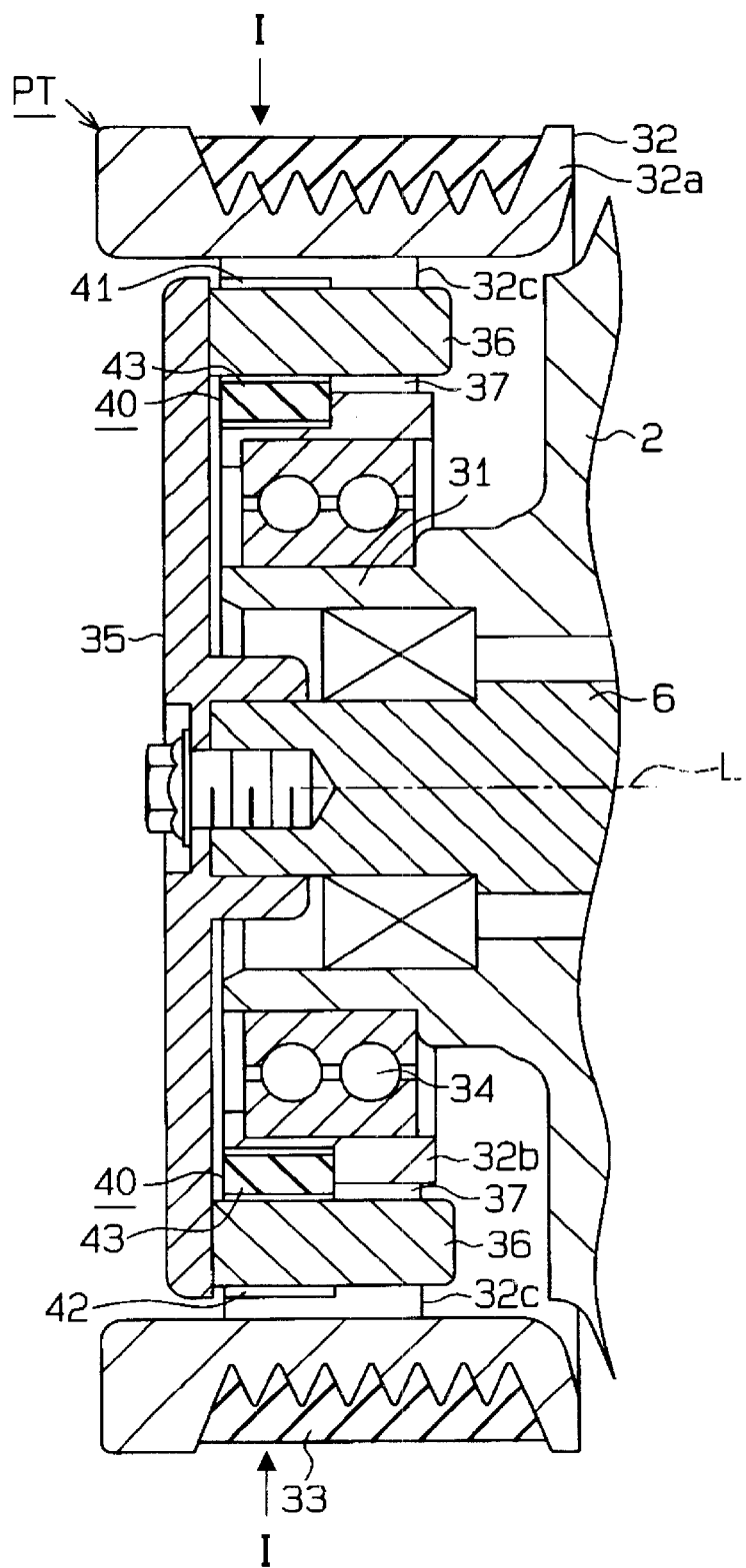
FIG. 2(a) is an enlarged view of a power transmission mechanism in FIG. 1.

A preferred embodiment of the power transmission mechanism of the present invention which is applied to a variable displacement type swash plate compressor is described herein.

To begin with, a variable displacement type swash plate compressor hereafter will be referred to as a compressor. As shown in FIG. 1, the compressor has a cylinder block 1, a front housing 2 secured to a front end of the cylinder block 1 and a rear housing 4 secured to a rear end of the cylinder block 1 through a valve plate assembly 3. The cylinder block 1, the front housing 2 and the rear housing 4 constitute a compressor housing. The directional notation of "front" is the left of the drawing and that of "rear" is the right of the drawing.

A crank chamber 5 is defined between the cylinder block 1 and the front housing 2. In the crank chamber 5, a drive shaft 6 is rotatably supported by the compressor housing, and a lug plate 11 is integrally formed with the drive shaft 6.

A front end of the drive shaft 6 is operably connected to a vehicle engine E, which is an external drive source, through a power transmission mechanism PT. The power transmission mechanism PT may be a clutch mechanism such as an electromagnetic clutch that is capable of selecting power transmission/interruption by way of external electric control. Otherwise, the power transmission mechanism PT, is a clutchless mechanism such as a belt and pulley combination, in which the power is transmitted all the time. In this preferred embodiment, a clutchless power transmission mechanism PT is employed.

Still referring to FIG. 1, a swash plate 12 is housed in the crank chamber 5. The swash plate 12 is slidably and inclinably supported by the drive shaft 6. A hinge mechanism 13 is located between the lug plate 11 and the swash plate 12. Accordingly, the hinge mechanism 13 and the drive shaft 6 make the swash plate 12 capable of synchronized rotation around the drive shaft 6, sliding in an axial direction L of the drive shaft 6 and inclining with respect to the drive shaft 6.

Multiple cylinder bores 1a, of which only one is shown in FIG. 1, surround the drive shaft 6 in the cylinder block 1 to penetrate the cylinder block 1. A single-headed piston 20 is disposed in each of the cylinder bores 1a. A front end and a rear end of each of the cylinder bores 1a are closed with the valve plate assembly 3 and the piston 20. In each of the cylinder bores 1a, a compression chamber, that is capable of varying its volume according to the reciprocating movement of the piston 20, is defined. Each piston 20 is engaged with the outer circumference of the swash plate 12 through a pair of shoes 19. Because of the above mechanism, the rotation of the swash plate 12 generated by the rotation of the drive shaft 6 is converted to a linear reciprocating movement of the piston 20 through the shoes 19.

A suction chamber 21 and a discharge chamber 22 are defined by the valve plate assembly 3 and the rear housing 4. Refrigerant gas in the suction chamber 21 is drawn into the cylinder bore 1a through a suction port 23 and a suction valve 24 formed in the valve plate assembly 3 by way of the reciprocating movement of the piston 20, which moves from a top dead center to a bottom dead center of the piston 20. The refrigerant gas drawn into the cylinder bore 1a is compressed to a predetermined level by way of reciprocating movement of the piston 20 from the bottom dead center to the top dead center. The compressed refrigerant gas is discharged into the discharge chamber 22 through a discharge port 25 and a discharge valve 26 formed on the valve plate assembly 3.

A constitution of a discharge capacity control mechanism in the compressor will be described herein. In the compressor described above, the swash plate 12 can be set between at a maximum inclination angle, which is shown in FIG. 1 and at a minimum inclination angle by adjusting internal pressure in the crank chamber 5 using an electromagnetic control valve CV.

In other words, the suction chamber 21 is linked to the crank chamber 5 through a bleeding passage 27. The discharge chamber 22 is linked to the crank chamber 5 through a supply passage 28. The electromagnetic control valve CV is provided in the supply passage 28. The opening degree of the electromagnetic control valve CV is controlled by a controller which is not shown in FIG. 1. The amount of high-pressure refrigerant gas to be supplied from the discharge chamber 22 into the crank chamber 5 through the supply passage 28 is controlled by the electromagnetic control valve CV. The internal pressure of the crank chamber 5 is defined by an equilibrium between the amount of the high-pressure refrigerant gas supplied from the discharge chamber 22 into the crank chamber 5 through the supply passage 28 and the amount of refrigerant gas released from the crank chamber 5 into the suction chamber 21 through the bleeding passage 27. The difference between the crank chamber 5 and the cylinder bore 1a in pressure acting on the piston 20 changes base on a pressure change in the crank chamber 5. As a result, the inclination angle of the swash plate 12 varies. Thus, a stroke amount of the piston 20 which defines the amount of the refrigerant gas to be discharged is adjusted.

Figure 2B:
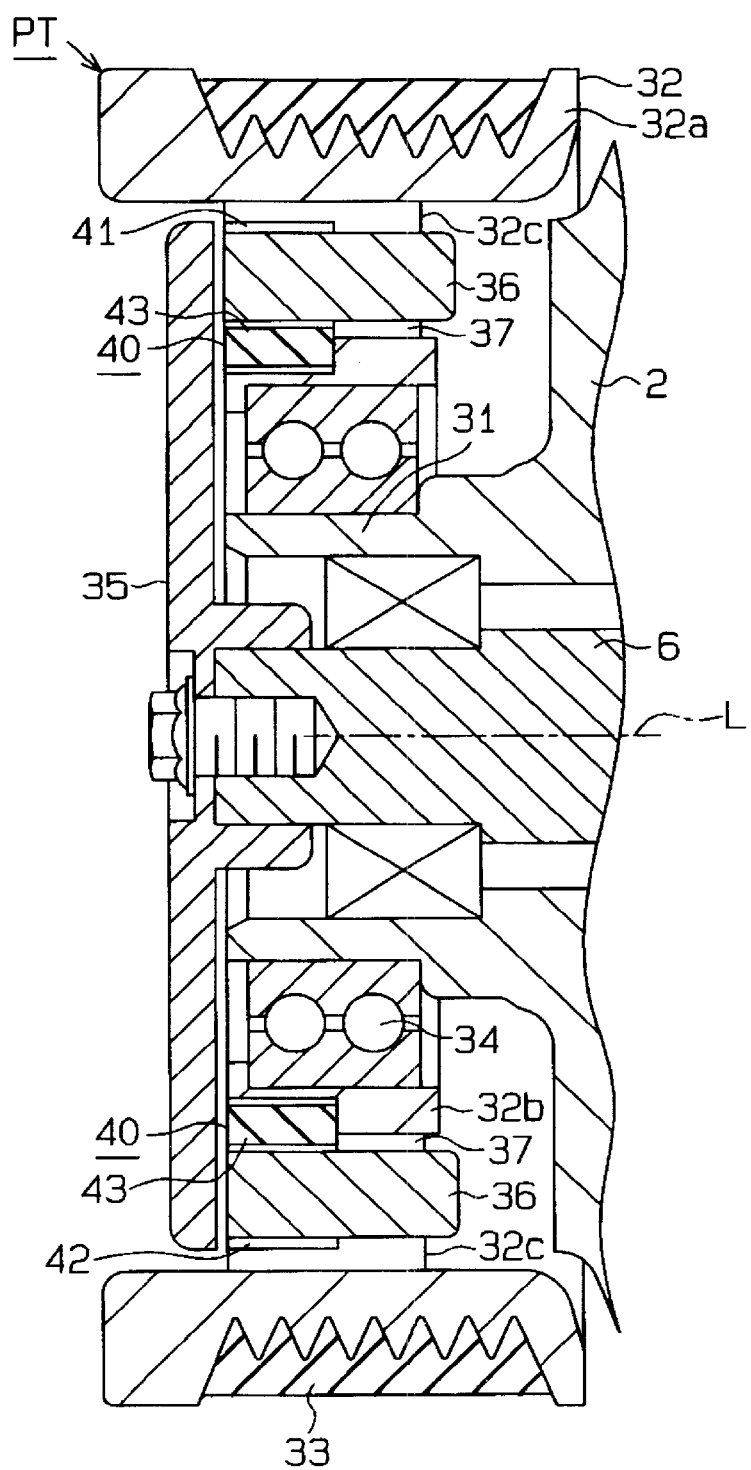
FIG. 2(b) is a diagram in which engaged pins brake and detach from a hub in FIG. 2(a)

Components of a power transmission mechanism will be described herein. As shown in FIGS. 2(a) and 2(b), a cylindrical support portion 31 protrudes on an outer wall of the front housing 2 so as to surround the front end of the drive shaft 6. A pulley 32 functioning as a rotating member, has an outer cylindrical portion 32a where a belt 33 is wound for transmitting power from an engine E as shown in FIG. 1. An inner cylindrical portion 32b is arranged at an inner circumference of the outer cylindrical portion 32a, and multiple spokes 32c coaxially connect the outer cylindrical portion 32a to the inner cylindrical portion 32b. The pulley 32 is rotatably supported by the inner cylindrical portion 32b via a bearing 34 around the cylindrical support portion 31 of the front housing 2. In other words, the pulley 32 is arranged on the same axis as the drive shaft 6 and rotatable around the drive shaft 6.

A disk-like hub 35 functions as another rotating member and is integrally formed with the front end of the drive shaft 6. The hub 35 contacts the drive shaft 6 in a rotational direction of the drive shaft 6 by a structure such as a spline engagement or keyway which is not illustrated. A plurality of flat power transmitting pins 36 functions as engaged convexities. The power transmitting pins 36 are fixed on the outer circumference of the rear surface of the hub 35 around an axis L at a predetermined interval. In this embodiment, four of the flat engaged pins are fixed at 90 degrees interval. Each of the power transmitting pins 36 has respectively a first rotating member surface in its outer circumferential surface. The first rotating member surface has two side surfaces 36a and 36b in the radial direction of the pulley 32. A first power transmitting surface 36a of the first rotating member surface faces the convex portion 41b, and a second power transmitting surface 36b of the first rotating member surface faces the convex portion 42b.

In the pulley 32, the space surrounded by a pair of spokes 32c, the outer cylindrical portion 32a and the inner cylindrical portion 32b together constitute a power transmitting recess 37 that is open in the forward and rearward directions of the axis L. A plurality of the power transmitting recess 37 is formed around the axis L at a predetermined interval. In this embodiment, four of the power transmitting recesses 37 are formed at 90 degrees interval.

Figure 4:
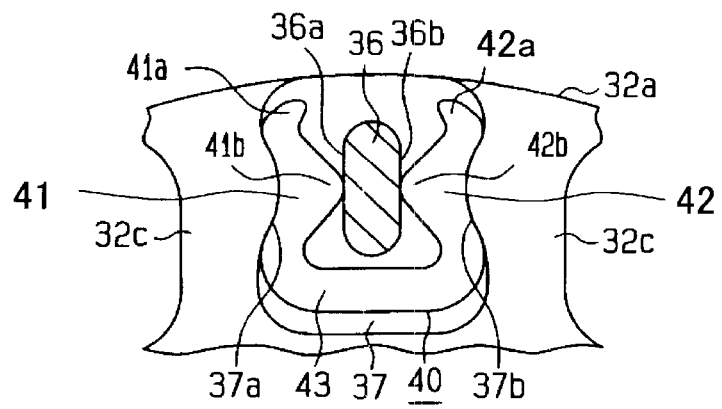
FIG. 4 is an enlarged view of one of the power transmission mechanisms of FIG. 3 according to the present invention.

As shown in FIG. 4, in the power transmitting recess 37, the pair of spokes 32c has respectively a second rotating member surface in its inner circumferential surface. The second rotating member surface has two side surfaces 37a and 37b in the radial direction of the pulley 32. A first power transmitting surface 37a of the second rotating member surface faces the opposite portion to the convex portion 41b with respect to a first elastic receiving portion 41, and a second power transmitting surface 37b of the second rotating member surface faces the opposite portion to the convex portion 42b with respect to a second elastic receiving portion 42. In the power transmitting recess 37, each of the first and second power transmitting surfaces 37a and 37b expands towards the facing power transmitting surfaces 36b and 36a midway in a radial direction.

Figure 3:
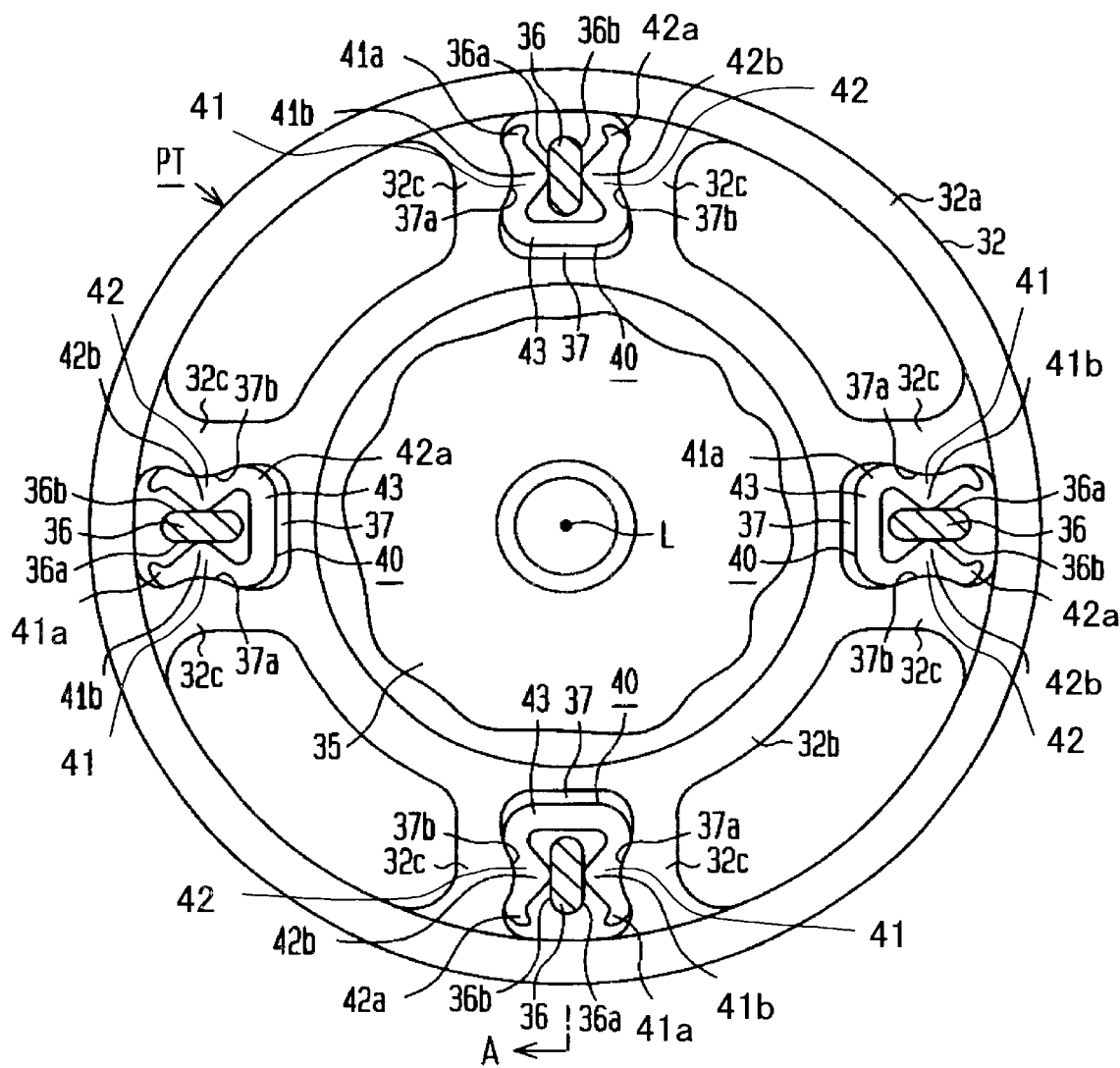
FIG. 3 is a cross-sectional view illustrating the power transmission mechanism taken at I—I of FIG. 2(a)

The power transmitting pin 36 of the hub 35 is rearwardly and loosely inserted in each power transmitting recess 37. In the portion in which the power transmitting recess 37 and the power transmitting pin 36 are fitted to each other, a set of the first power transmitting surfaces 36a and 37a and a set of the second power transmitting surfaces 36b and 37b are arranged to face each other. Assume that an elastic member 40 is not in existence. If the pulley 32 rotates clockwise in FIG. 3, the second power transmitting surfaces 36b and 37b move away from each other while the first power transmitting surfaces 36a and 37a contact each other. In contrast, if the pulley 32 rotates counterclockwise in FIG. 3, the first power transmitting surfaces 36a and 37a move away from each other while the second power transmitting surfaces 36b and 37b contact each other. In each case, the hub 35 rotates with the pulley 32 in the same direction. In other words, the first power transmitting surface 36a of the power transmitting pin 36 and the first power transmitting surface 37a of the power transmitting recess 37 are arranged in a concentric manner about the common rotational axis L. The second power transmitting surface 36b of the power transmitting pin 36 and the second power transmitting surface 37b of the power transmitting recess 37 are also arranged in a concentric manner about the axis L.

Figure 5:
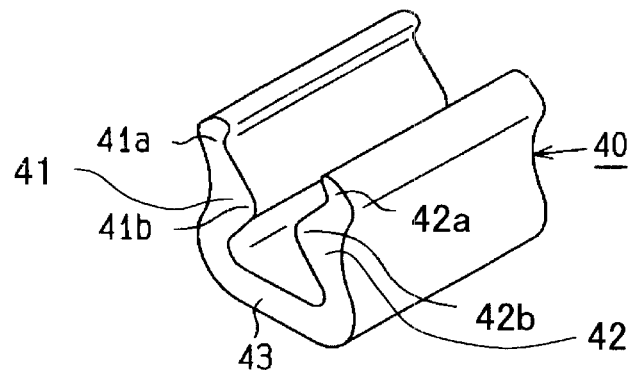
FIG. 5 is a perspective view of an elastic member.

The elastic member 40 made of synthetic rubber is inserted in the power transmitting recess 37, and the power transmitting pin 36 is fitted. As shown in FIGS. 4 and 5, the elastic member 40 has the first elastic receiving portion 41, the second elastic receiving portion 42 and a connecting portion 43. The first elastic receiving portion 41 is sandwiched between the first power transmitting surfaces 36a and 37a. The second elastic receiving portion 42 is sandwiched between the second power transmitting surfaces 36b and 37b. The connecting portion 43 connects both of the elastic receiving portions 41 and 42. That is, in this embodiment, an elastic member or the first elastic receiving portion 41 and an elastic member 42 or the second elastic receiving portion 42 are integrally formed to provide a single elastic member 40. The first elastic receiving portion 41, the second elastic receiving portion 42 and the connecting portion 43 are integrally formed by an extrusion molding.

Each of the elastic receiving portions 41 and 42 has bases 41a, 42a, and convex portions 41b and 42b. The bases 41a and 42a contact the power transmitting surfaces 37a and 37b in the power transmitting recess 37. The convex portions 41b and 42b, which are at the top of the elastic receiving portions 41 and 42, extend from the bases 41a and 42a toward the power transmitting surfaces 36a and 36b of each of the power transmitting pins 36 in the circumferential direction of the pulley 32. Surfaces of the bases 41a and 42a that contact the power transmitting surfaces 37a and 37b of the power transmitting recess 37 undulate along the curvature of the power transmitting surfaces 37a and 37b. This undulating surface is effective in preventing the bases 41a and 42a from moving against the first and second power transmitting surfaces 37a and 37b, thereby preventing the elastic member 40 from moving against the power transmitting recess 37 in the radial direction.

The convex portions 41b and 42b of each of the elastic receiving portions 41 and 42 gradually reduces a cross-sectional area in the circumferential direction of the pulley 32 and the hub 35, and finally have tips on the top from the bases 41a and 42a toward the power transmitting surfaces 36a and 36b of each of the power transmitting pins 36. The surfaces of the tips of the convex portions 41b and 42b are curved.

The following features are not illustrated in FIG. 4. When the elastic member 40 is inserted in the power transmitting recess 37, and the power transmitting pin 36 are fitted, torque load between the pulley 32 and the hub 35 is zero. However, each of the elastic receiving portions 41 and 42 is slightly compressed respectively by each of the power transmitting surfaces 36a, 37a, 36b and 37b. That is, the tips of the convex portions 41b and 42b are elastically deformed by a small amount. This elastic deformation prevents chattering between the power transmitting recess 37 and the power transmitting pin 36 and prevents the pulley 32 from moving against the hub 35 in either rotational direction.

An operation of a power transmission mechanism will be described herein. Rotational power of the engine E is transmitted to the pulley 32 through the belt 33. The rotational direction of the pulley 32 is determined by the rotational direction of the output axis of the engine E and the position of the compressor with respect to the engine E. If the pulley 32 is rotated clockwise in FIG. 3, the power transmission between the power transmitting recess 37 and the power transmitting pin 36 occurs between the first power transmitting surfaces 36a and 37a through the first elastic receiving portion 41 of the elastic member 40. On the contrary, if the pulley 32 is rotated counterclockwise in FIG. 3, the power transmission between the power transmitting recess 37 and the power transmitting pin 36 occurs between the second power transmitting surfaces 36b and 37b through the second elastic receiving portion 42 of the elastic member 40.

Figure 6:
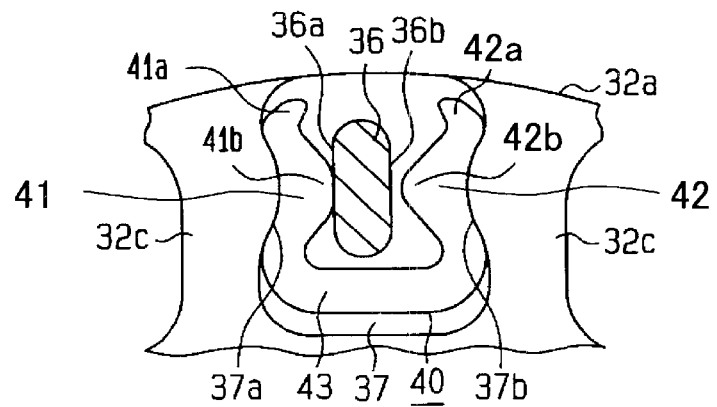
FIG. 6 is a diagram illustrating a beginning phase of a counterclockwise relative rotation of the power transmission mechanism as shown in FIG. 4.
Figure 7:
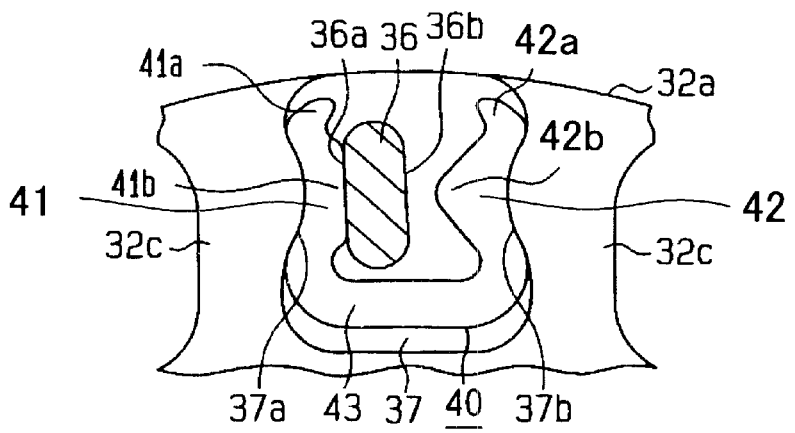
FIG. 7 is a diagram illustrating a counterclockwise relative rotation of the power transmission mechanism as shown in FIG. 4.

The pulley 32 is being rotated clockwise in FIGS. 6 and 7. In this case, the power transmission between the power transmitting recess 37 and the power transmitting pin 36 causes the first elastic receiving portion 41 of the elastic member 40 to be compressed between the first power transmitting surfaces 36a and 37a. This elastic deformation causes the power transmitting surfaces 36a and 37a to come close to each other, thereby generating relative rotation between the pulley 32 and the hub 35. The relative rotation angle between the pulley 32 and the hub 35 depends on the magnitude of the torque load generated between the pulley 32 and the hub 35. The amount of elastic deformation or the amount of compression of the first elastic receiving portion 41 also contributes to determine the relative rotation angle. Therefore, even if a drive torque between the pulley 32 and the hub 35 changes due to a change in the output torque of the engine E or in the drive torque of an auxiliary system such as a hydraulic pump in a power steering system driven by the engine E, the differential torque is absorbed in the repeated alternate clockwise and counterclockwise relative rotation of the pulley 32 and the hub 35.

As described, if the torque load in the compressor is less than a predetermined upper torque limit, in which the engine is not affected, and the engagement of the pulley 32 and the hub 35 will be maintained. Therefore, the power transmission from the engine E to the drive shaft 6 is continued.

As shown in FIG. 2(b), when some abnormality such as a dead lock occurs in the compressor and the torque load exceeds a predetermined upper limit, the bottom portion of the power transmitting pin 36 that joins the hub 35 is torn off from the hub 35 since it is unable to endure a bending load due to the excessive torque transmission. After the power transmitting pins 36 brake and detach from the hub 35, the power transmission between the pulley 32 and the hub 35 are interrupted. Because of the above intereruption, the excessive torque load generated by the compressor does not affect the engine E.

The power transmitting pin 36, that is broken and detached from the hub 35 is held between the elastic receiving portions 41 and 42 in the power transmitting recess 37 in the pulley 32 and does not affect the hub 35 during the rotation of the pulley 32. To surely hold the power transmitting pin 36 that is detached from the hub 35 within the power transmitting recess 37, it is essential that each of the elastic receiving portions 41 and 42 of the elastic member 40 is somewhat compressed between each of the power transmitting surface 36a, 37a and 36b, 37b, in the state that transmission torque is zero.

The above described embodiment of the present invention provides the following advantageous effects.

(1) In the elastic member 40, the convex portions 41b and 42b of the elastic receiving portions 41 and 42 have a triangular shape so that the convex portions 41b and 42b are easily deformed by the power transmitting pin 36 due to their smaller cross sectional areas. Therefore, as shown in FIG. 6, the tip of convex portion 41b is deformed even by a small torque load applied thereon when power is transmitted between the pulley 32 and the hub 35. This deformation causes the first power transmitting surfaces 36a and 37a, located between the power transmitting pin 36 and the power transmitting recess 37, to approach closely with each other.

Figure 8:
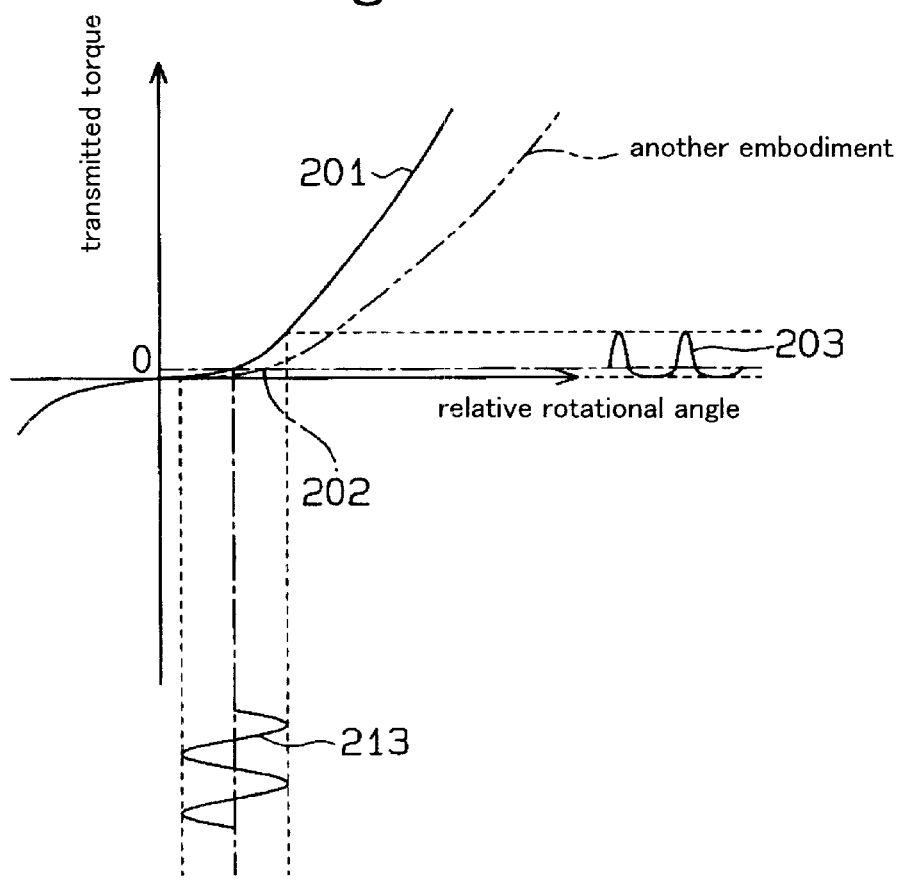
FIG. 8 is a graph illustrating an operating characteristic of the power transmission mechanism according to the present invention.

As a result, as a curve 201 of a graph in FIG. 8 shows, even a small drive torque generated by a state that discharged refrigerant gas from the compressor is a small amount, which is indicated in a dotted chain line 202, ensures substantially a large relative rotation angle between the pulley 32 and the hub 35 in the power transmission mechanism PT of the present invention. A curve 213 in FIG. 8 shows a torque change having large amplitude generated at the engine E, which is common to the amplitude in a conventional power transmission mechanism. To describe the line 213 in another way, if a large change occurs in the relative rotation angle between the pulley 32 and the hub 35, the differential torque region is shifted to the normal torque, which is transmitted from the engine E to the compressor as shown in the graph. As a result, even at a point around trough of the differential torque loads on the engine E, which is substantially represented by troughs on the left of the curve 213, the pulley 32 does not rotate relative to hub 35 in a direction opposite to the normal transmission direction with respect to the zero torque position on the coordinates.

For this reason, the amplitude of differential torque loads as shown in the curve 203 during the power transmission between the hub 35 and the compressor is substantially minimized. Even at a point around trough of the differential torque loads, which is shown in downward trough of the curve 203, generating a torque load in a direction opposite to the normal torque transmission direction is substantially minimized. Further, even if the fitting portion between the hub 35 and the drive shaft 6 is loose or the hinge mechanism 13 moves in the compressor in the direction of the torque transmission, abnormal vibration and noise will be substantially suppressed therein.

These descriptions made with reference to FIG. 8 assume that a compressor including the hub 35 rotates at a constant speed, while the pulley 32 rotates according to the torque load or a change of the rotation angle generated at the engine E, as described in the related art section.

(2) Regarding each of the elastic receiving portions 41 and 42 of the elastic member 40, only their convex portions 41b and 42b contact the power transmitting surfaces 36a and 36b of the power transmitting pin 36. In other words, the elastic receiving portions 41 and 42 contact the power transmitting surfaces 37a and 37b by way of the bases 41a and 42a that have a large contact surfaces even when the torque load to be transmitted is small. As a result, a stable linkage is provided between the elastic receiving portions 41, 42 and the power transmitting surfaces 37a, 37b of the power transmitting recess 37. Therefore, compression deformation of the convex portions 41b and 42b of the elastic member 40 is stabilized, thereby ensuring stable absorption of differential torque loads to be transmitted.

(3) The power transmitting pin 36 and the power transmitting recess 37 have the first power transmitting surfaces 36a, 37a and the second power transmitting surfaces 36b, 37b. Therefore, the power transmission between the pulley 32 and the hub 35 and absorption of the differential torque loads generated between the two are ensured regardless of the direction in which the pulley 32 and the hub 35 rotate. In other words, the power transmission mechanism PT of the present invention does not limit rotational direction, providing compatibility with various directions.

(4) The elastic member 40 is so formed that the connecting portion 43 is integrally connected between the first elastic receiving portion 41 and the second elastic receiving portion 42. Therefore, the power transmission mechanism PT provides easy-to-handle features during assembly and requires fewer assembling steps.

(5) The elastic member 40 is sandwiched between the power transmitting recess 37 and the power transmitting pin 36. In other words, the elastic member 40 is fitted in, to some degree, a closed space between the two. Therefore, the elastic member 40 is secured at a given position without requiring adhesives etc., and reduces its manufacturing cost.

These embodiments are not limited to be above mentioned structures, but the following embodiments are also within the scope of the invention.

Figure 9:
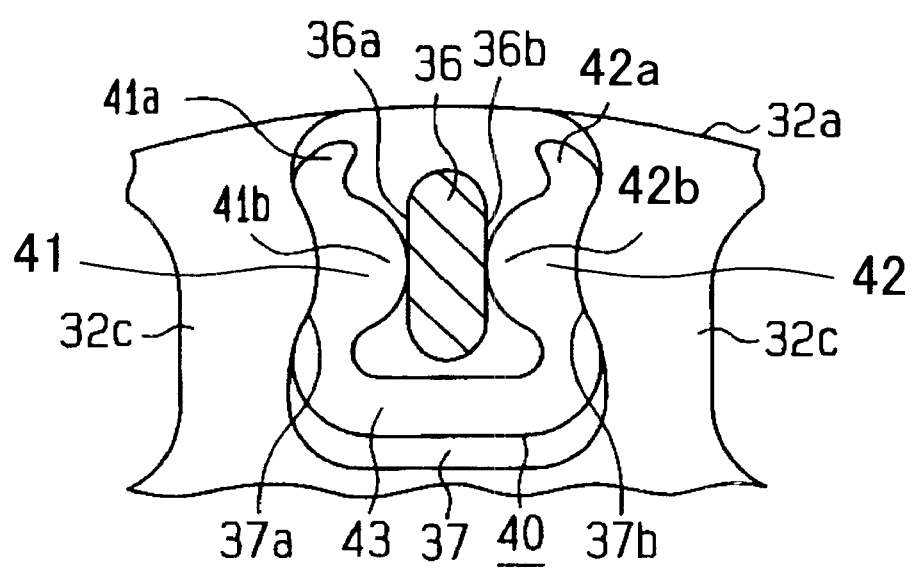
FIG. 9 is a cross-sectional view illustrating one modification of the embodiment of the power transmission mechanism according to the present invention.

As shown in FIG. 9, the convex portions 41b and 42b of the elastic member 40 are formed with a curved convex surface as a whole. The effect of this modification remains the same as the embodiment described above. Formation of the curved convex surfaces on the convex portions 41b and 42b is not limited to the shape as shown in FIG. 9. The curved convex surfaces include hemispherical surfaces.

Figure 10A:
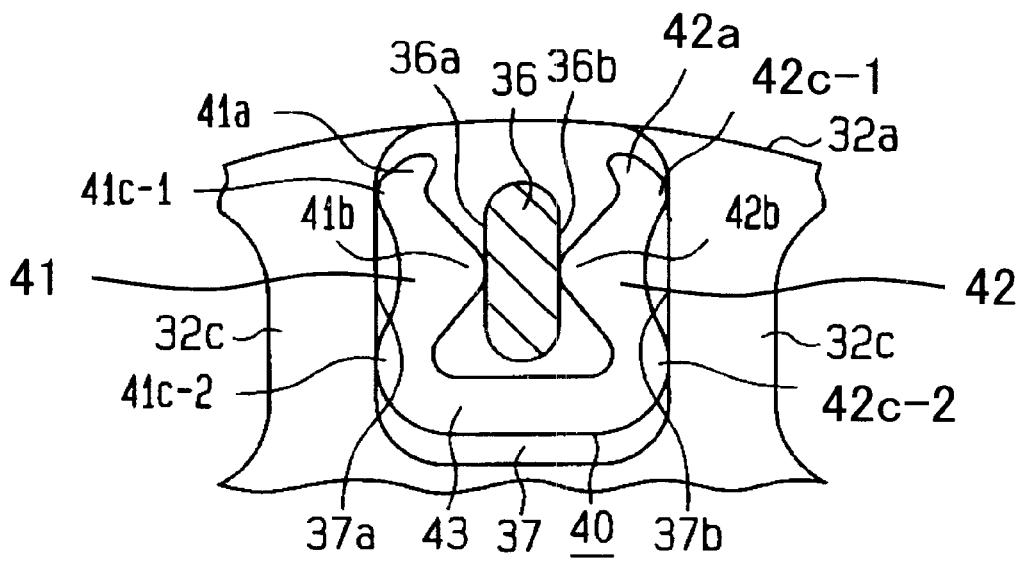
FIG. 10(a) is a cross-sectional view illustrating other modification of the embodiment of the power transmission mechanism according to the present invention.
Figure 10B:
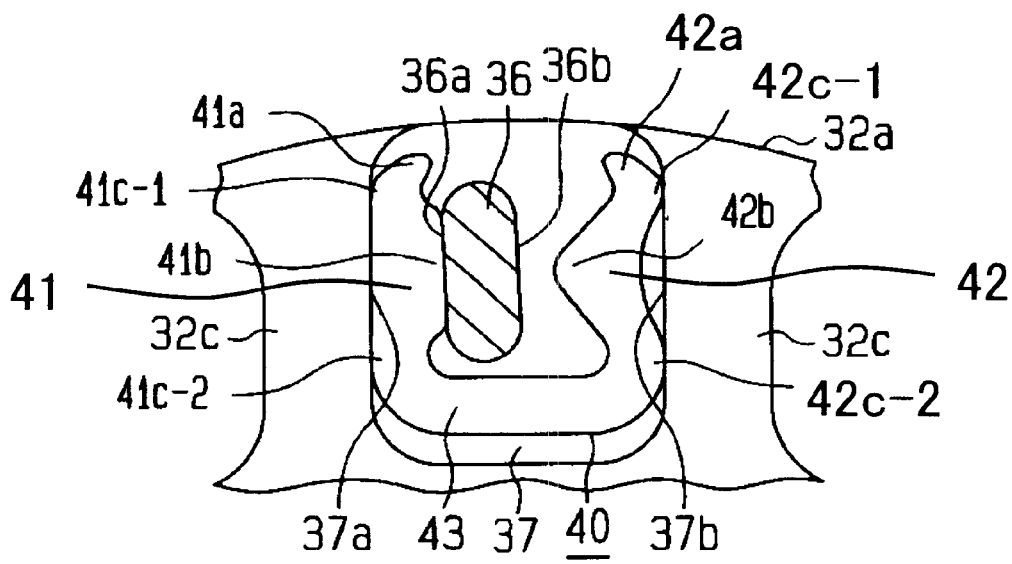
FIG. 10(b) is a cross-sectional view illustrating a relative rotation of the power transmission mechanism.
Figure 11:
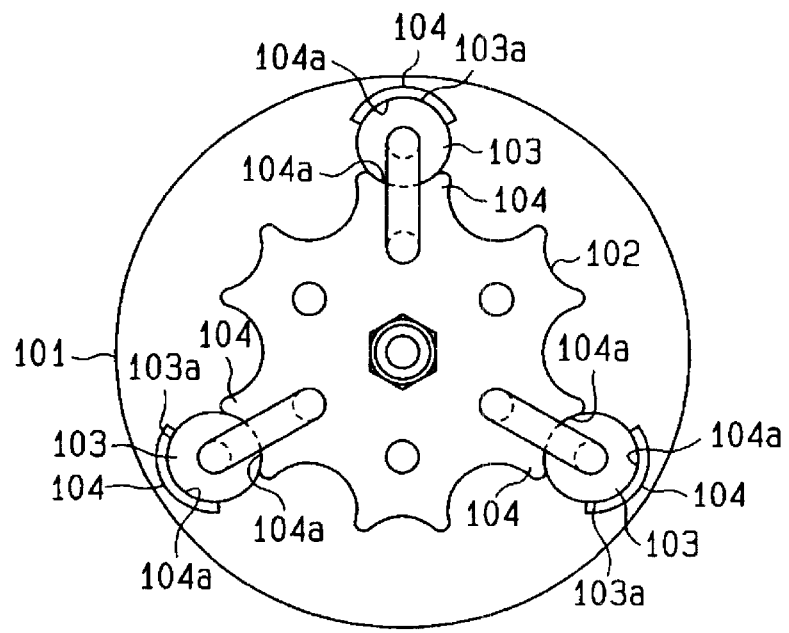
FIG. 11 is a front view illustrating a power transmission mechanism according to a conventional art.
Figure 12:
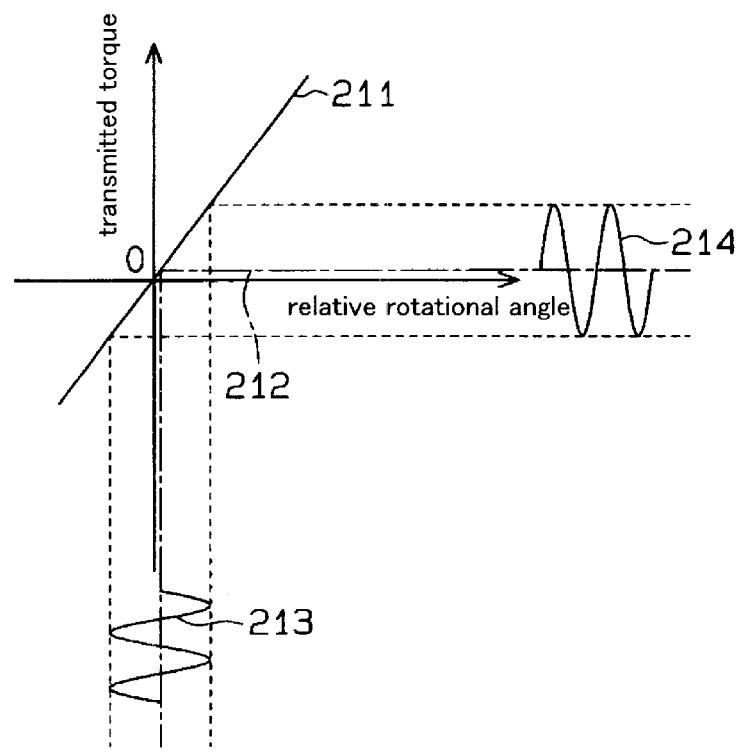
FIG. 12 is a graph illustrating an operating characteristic of a power transmission mechanism according to a conventional art.

As shown in FIG. 10(*a*), the elastic receiving portions 41 and 42 are formed such that each of the power transmitting surfaces 36a, 36b and 37a, 37b of the power transmitting pin 36 and the power transmitting recess 37 contacts the convex portions 41b, 41c and 42b, 42c.

Still referring to FIG. 10(*a*), the power transmitting surfaces 37a and 37b of the power transmitting recess 37 are each located on a single plane. As a result, the bases 41a and 42a of each of the elastic receiving portions 41 and 42 have curved surfaces contacting the power transmitting surfaces 37a and 37b, but the bases 41a and 42a do not contact the power transmitting surfaces 37a and 37b near midway in the radial direction when there is no torque load. In other words, each of the elastic receiving portions 41 and 42 has two convex portions 41c-1, 41c-2 and 42c-1, 42c-2 that are formed in inward and outward radial directions, and all of the convex portions 41c-1, 41c-2 and 42c-1, 42c-2 contact the power transmitting surfaces 37a and 37b. The convex portions 41b and 42b of the elastic receiving portions 41 and 42 shift in the radial direction of the pulley 32 with respect to the convex portions 41c-1, 41c-2 and 42c-1, 42c-2, which are opposite to the convex portions 41b and 42b, and are arranged between the convex portions 41c-1, 41c-2 and 42c-1, 42c-2. As shown in FIG. 10(*b*), as a result, as soon as a torque load transmission begins, entire bases 41a and 42a are pressed flat so that the elastic receiving portions 41 and 42 are deformed easily. Even with a small torque load transmitted thereto, the power transmitting surfaces 36a, 37a and 36b, 37b come into further proximity with each other. Accordingly, as a graph in this case as another example indicated in two-dotted chain lines as shown in FIG. 8, it is apparent from the graph that a small torque load can ensure a large relative rotation angle between the pulley 32 and the hub 35, thereby more effectively performing the effect of the present invention as described in the above section (1).

The embodiment as shown in FIG. 10(*a*) is modified in such a way that the convex portions 41b and 42b of each of the elastic receiving portions 41 and 42 are formed parallel to an axis L and/or a radial direction with respect to the convex portions 41c-1, 41c-2 and 42c-1, 42c-2 that are arranged opposite to the convex portions 41b and 42b. The same operation and effect as those of the embodiment as shown in FIG. 10(*a*) are obtained.

The sharp edges of the convex portions 41b and 42b of the elastic member 40 is not limited to the shape as described in the above embodiment. The shape of the convex portions 41b and 42b include a conical shape.

The first elasticity receiving portion 41 and the second elastic receiving portion 42 are formed independently as separate elastic members.

The embodiment without the torque limit configuration is configured such that the power transmitting pin 36 does not brake under an excess torque load.

Four sets of the power transmitting recesses 37 and the power transmitting pins 36 are provided in the above embodiment. However, the number of set is not limited to four. Any number such as six, five, three, two or one set is also applicable to the present invention. A small number of sets provides an improvement of assembly efficiency, thereby lowering cost of the power transmission mechanism PT. A larger number of sets reduces the torque load per set of the power transmitting pin 36 and the power transmitting recess 37, thereby extending durability of the power transmission mechanism PT.

The use of the power transmission mechanism PT of the present invention is not limited to the power transmission between the engine E and the compressor used for an air conditioner. It is also applied to the power transmission between the engine E and auxiliary equipments other than the compressor used for the air conditioner, such as a hydraulic pump for a power steering system, a mechanical supercharger and a cooling fan for a radiator. The application of the power transmission mechanism PT of the above embodiment is not limited to vehicle power transmission and is applied to the power transmission system between a drive source and a tool in a machine tool. That is, the power transmission mechanism PT of the above embodiment is applied to any power transmission route system.

As described above, the power transmission mechanism according to the present invention does not easily transmit a negative torque to an equipment even if a large torque change occurs at the external drive source.

The present examples and embodiments are to be considered as illustrative and not restrictive and the invention is not to be limited to the details given herein but may be modified within the scope of the appended claims.

What is claimed is:

1. A power transmission mechanism comprising:
   a first rotating member rotating around an axis and having a first rotating member surface;
   a second rotating member rotating around the axis and having a second rotating member surface; and
   an elastic member located between said first rotating member and said second rotating member, said elastic member having at least a protrusion contacting at least the first rotating member surface, the protrusion extending in a circumferential direction of said first rotating member, wherein the protrusion has gradually tapering shape toward the first rotating member surface, said elastic member being deformed by compression as said elastic member engaging the first rotating member surface and the second rotating member surface by rotation of said first rotating member, thereby causing relative rotation of said first rotating member and said second rotating member.

2. The power transmission mechanism according to claim 1 wherein a plurality of the protrusions is defined, and wherein the protrusions are formed to be a triangular shape toward the first rotating member surface.

3. The power transmission mechanism according to claim 1 wherein a plurality of the protrusions is defined, and wherein the protrusions are formed to be convex curvature toward the first rotating member surface.

4. The power transmission mechanism according to claim 1 wherein said elastic member has the protrusion contacting only the first rotating member surface.

5. The power transmission mechanism according to claim 1 wherein said elastic member contacts the first rotating member surface and the second rotating member surface at different positions in the axial direction of said first rotating member.

6. The power transmission mechanism according to claim 1 wherein said elastic member contacts the first rotating member surface and the second rotating member surface at different positions in a radial direction of said first rotating member.

7. The power transmission mechanism according to claim 1 wherein said elastic member contacts the first rotating member surface and the second rotating member surface at different positions in axial and radial directions of said first rotating member.

8. The power transmission mechanism according to claim 1 wherein the first rotating member surface and the second rotating member surface are arranged in a concentric manner about the axis.

9. The power transmission mechanism according to claim 1 wherein said first rotating member and said second rotating member have a plurality of pairs of the first rotating member surface and the second rotating member surface which are capable to transmit a torque in clockwise and counterclockwise directions between said first rotating member and said second rotating member.

10. The power transmission mechanism according to claim 9 wherein said elastic member is one body.

11. The power transmission mechanism according to claim 1 wherein said first rotating member forms at least a projection and said second rotating member forms at least a recess, the recess receiving the projection, said elastic member being located between the first rotating member surface and the second rotating member surface.

12. The power transmission mechanism according to claim 1 wherein said first rotating member has the projection which is detachable from said first rotating member when a torque transmitted between said first rotational member and said second rotating member reaches a predetermined torque limitation.

13. The power transmission mechanism according to claim 1 wherein a plurality of the protrusions is defined, the protrusions contacting the first rotating member surface and the second rotating member surface, the protrusions extending in a circumferential direction of said first rotating member and said second rotating member, wherein the protrusions have gradually tapering shape toward the first rotating member surface and the second rotating member surface.

14. A compressor connected to an external drive source, said compressor comprising:
  a compression unit having a drive shaft for compressing refrigerant;
  a power transmission unit comprising,
    a first rotating member mounted on the drive shaft, the first rotating member having a first rotating member surface,
    a second rotating member rotatable around the drive shaft, the second rotating member having a second rotating member surface, and
    an elastic member located between the first rotating member and the second rotating member, the elastic member engaging the first rotating member surface and the second rotating member surface, the elastic member having at least a protrusion contacting at least the first rotating member surface, the protrusion extending in a circumferential direction of the first rotating member, wherein the protrusion has gradually tapering shape toward the first rotating member surface, the elastic member being deformed by compression as the elastic member engaging the first rotating member surface and the second rotating member surface by rotation of the first rotating member, thereby causing relative rotation of the first rotating member and the second rotating member; and
  an outer drive unit connected to said power transmission unit for driving the second rotating member.

15. The compressor according to claim 14 wherein the first rotating member is a hub with pins and the second rotating member is a pulley.

16. The compressor according to claim 14, said compression unit further comprising:
  a cylinder block having a plurality of cylinder bores, the drive shaft being rotatably supported in said cylinder block;
  a piston disposed in each of the cylinder bores for compressing the refrigerant; and
  a swash plate placed on the drive shaft for converting rotation of the drive shaft to reciprocating movement of the piston through shoes.

17. The compressor according to claim 14 wherein the elastic member is made of rubber.

18. The compressor according to claim 14 wherein said compression unit varies an amount of the refrigerant to be compressed.

19. A power transmission unit used in connection with a compressor, the compressor comprising a compression unit having a drive shaft for compressing refrigerant, said power transmission unit comprising:
  a first rotating member mounted on the drive shaft, said first rotating member having a first rotating member surface;
  a second rotating member rotatable around the drive shaft, said second rotating member having a second rotating member surface; and
  an elastic member located between said first rotating member and said second rotating member, said elastic member engaging the first rotating member surface and the second rotating member surface, said elastic member having at least a protrusion contacting at least the first rotating member surface, the protrusion extending in a circumferential direction of said first rotating member, wherein the protrusion has gradually tapering shape toward the first rotating member surface, said elastic member being deformed by compression as said elastic member engaging the first rotating member surface and the second rotating member surface by rotation of said first rotating member, thereby causing relative rotation of said first rotating member and said second rotating member.

* * * * *